Jan. 3, 1967  A. M. BECHTOLD  3,296,056
MEANS FOR POSTFORMING PLASTIC LAMINATED PRODUCTS
Filed Feb. 25, 1964  6 Sheets-Sheet 1

INVENTOR
ANTHONY M. BECHTOLD

BY *Ephraim Dunning III*
ATTORNEY

Jan. 3, 1967  A. M. BECHTOLD  3,296,056
MEANS FOR POSTFORMING PLASTIC LAMINATED PRODUCTS
Filed Feb. 25, 1964  6 Sheets-Sheet 4

INVENTOR
ANTHONY M. BECHTOLD

BY *Ephraim Burney III*
ATTORNEY

Jan. 3, 1967 A. M. BECHTOLD 3,296,056
MEANS FOR POSTFORMING PLASTIC LAMINATED PRODUCTS
Filed Feb. 25, 1964

INVENTOR
ANTHONY M. BECHTOLD

United States Patent Office 3,296,056
Patented Jan. 3, 1967

3,296,056
MEANS FOR POSTFORMING PLASTIC
LAMINATED PRODUCTS
Anthony M. Bechtold, Fort Lauderdale, Fla., assignor to Bechtold Engineering Company, Fort Lauderdale, Fla., a corporation of Florida
Filed Feb. 25, 1964, Ser. No. 347,227
22 Claims. (Cl. 156—461)

This invention relates to an automated machine for operating upon a selected portion or portions of a laminate preliminary applied flatwise to the face of an elongated core for subsequent conformation thereupon and bonding thereto and, optionally, to one or both of the longitudinal side faces of the core. It is the improved means employed in such conformations and bonding of the laminate to the core that constitutes the major features of this invention.

In the ensuing description the term "laminate" will refer to a plastic material, either thermosetting or thermoplastic, which, when applied to a base material, will provide a durable and attractive facing therefor. Such a base, hereinafter called a "core," is commonly produced from plywood, or particle wood, the latter being frequently referred to as "chipboard." The work to be operated upon by the present machine is such a laminate, in strip form, pre-assembled with an elongated core and extended flatwise over its entire top face to which it is locally and permanently bonded with free edge portions of the laminate extending out coplanarly beyond opposite longitudinal faces of the core. Completion of the desired product requires that, after application of a suitable adhesive to assure subsequent bonding, the laminate portions to be conformed should first be heated, then be bent to conform with the adjacent core face or faces, then be held with a firm and substantially continuing pressure thereagainst while bonding takes place, and finally be trimmed off to remove any excess material lapping beyond any adjacent face of the core. By the present means herein to be described, these several operations may be performed expeditiously and dependably, and with a minimum of time and expense.

Among other objects of this invention is the provision for adjustability incorporated into the present machine. This is important because the work may vary widely in cross-sectional contour and dimensions, necessitating in each case that the machine be re-adjusted properly so that the operations of heating, postforming, bonding and trimming may be successfully performed with due regard for the nature of the laminate and core materials used. Since the finished product is designed for many different uses, its cross-sectional form and dimensions may vary widely as, for example, when it is to serve for building interior trim, as components for furniture, cabinets, etc. While it is common in all such products for one or both of the longitudinal edges of the core adjacent its top face to be rounded in some degree at least, the application of a laminate facing to a core so formed presents difficulties, particularly because of the wide variations which exist in their cross-sectional contours and dimensions. According to this invention, however, the present machine may be readily and accurately adjusted to operate successfully upon all such work with assurance of durable and dependable results in every case.

A primary object attained by this invention is an expeditious processing of the work without damage to or marring of its laminate component. While the exposed surface of laminate material is hard and wear-resistant at ordinary room temperatures, the opposite is true when it is first heated to become softened and flexibilized as is requiste to a forming operation which is involved in its conformation to a contoured core. It is during this heated and softened stage that the laminate surface is most sensitive to injury. In the present machine I provide forming means to frictionally pressure-engage the laminate, while moving at even speed therewith, such means being also somewhat resilient and very smooth whereby to avoid marring of the laminate surface or leaving any trace of its contact therewith. As a result, the laminate facing so conformed and bonded to the core therefor, will be as attractive and perfect as ever, and with no impairment to its appearance or life expectancy.

It is also an object of this invention that the several units of the machine be capable of operating upon work pieces varying almost indefinitely in length; also upon work pieces varying widely in cross-sectional contours, either symmetrical or otherwise; also upon work having a thickness up to 3" or so and widths ranging downwardly from 6" or so. Work so variable in contours and dimensions is difficult to handle. Mechanisms heretofore designed for operating upon such small work, particularly where wide variations in dimensions and contours are involved, have proved unsatisfactory and troublesome in the past. Drawbacks such as these are adequately and effectively overcome in the present machine by means which are accessible, dependable, and relatively inexpensive. Furthermore, as compared with previous mechanisms, the present machine in its entirety has been much simplified, also reduced in size, weight and cost, thus enhancing its adaptability for use wherever there is need for operations to be performed of the kind for which it is specially designed.

Other objects and advantages inherent in this invention will appear from the ensuing detailed description, taken in conjunction with the accompanying drawings wherein is illustrated a machine embodying the present improvements. In these drawings:

FIG. 3 is an abbreviated perspective view of one example of a work piece of substantially rectangular cross-section, its core having a top face formed with a pair of side-by-side, longitudinally extending, beads meeting at a central point crosswise thereof, the beads being curved around to merge with opposite side faces of the core, a strip of laminate facing being applied and affixed to the tops of the beads with opposite free edge portions of the lamniate extended coplanarly laterally therefrom, this being the condition of the work when it is first placed in the machine preparatory to certain operations by which the laminate is heated, then bent to conform with the core top face and to overlie closely one of its opposite side faces, then bonded thereto, and finally trimmed evenly with the bottom face thereof;

FIG. 9 is a transverse section through a further example of work piece as it appears when its laminate component has been fully conformed, bonded, and trimmed pursuant to this invention, the profile of this work piece being designed specially for application along one edge of a billiard table or the like;

Figure 1:
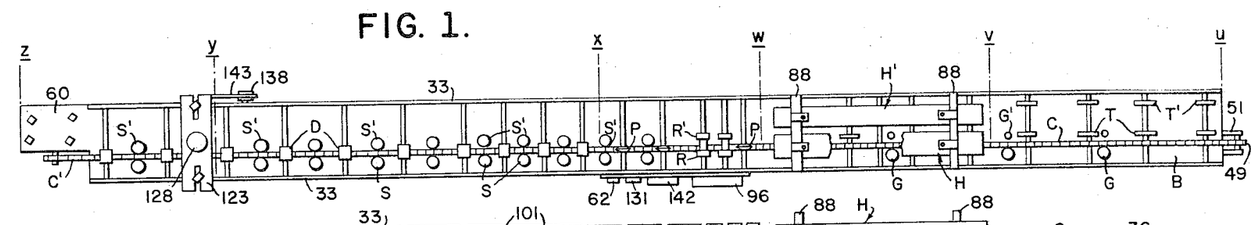
FIGURE 1 is a semi-diagrammatic top plan view of the machine in its entirety, showing certain of the operating units arranged in two rows adjusted to provide therebetween the requisite space for accommodation of moving elongated work pieces which are relatively narrow.
Figure 2:
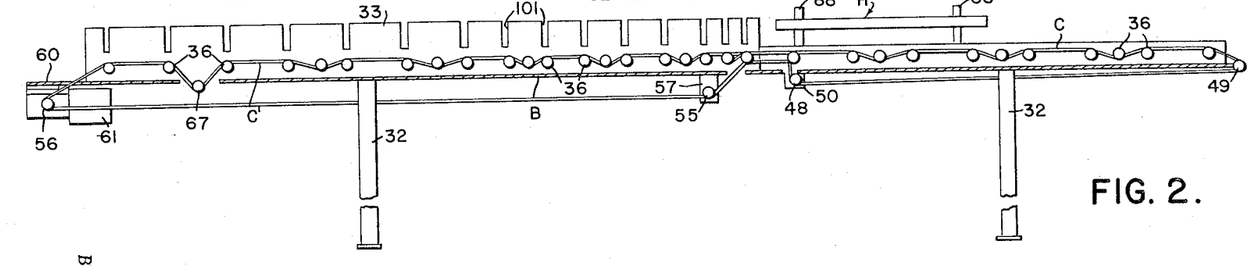
FIG. 2 which is a semi-diagrammatic longitudinal vertical section through the machine in its entirety, is confined mainly to a showing of the chain system which provides the propulsion means for the work passing through the machine, most of the operating units for the work being omitted from the view.

A general understanding of this invention may best be gained by an initial reference to FIGS. 1 and 2 wherein are shown diagrammatically a top plan of, and a longitudinal section through, the machine in its entirety. It comprises a plate base B mounted upon legs 32 to provide a conveniently elevated support for the various agencies which operate upon elongated pieces of work W when and as advanced through the machine. The work consists of (1) an elongated core $c$ of generally rectangular cross-section with one face (or faces) longitudinally contoured to a desired design and, spread over its contoured face and adhesively affixed locally thereto, (2) a flat strip of laminate $l$ whose free edge portions are oppositely extended coplanarly to lie beyond the confines of the core. Assembly of the laminate and core is facilitated by first spraying or otherwise coating the laminate back with an adhesive, the core faces to be covered being similarly treated. The adhesive may be a quick-drying contact adhesive so that, when substantially dried, bonding will readily take place in response to pressure contact. By way of example, work exhibiting two conventional designs are illustrated in the drawings, that in FIGS. 3–5 having a contoured top face wherein a longitudinal flute lies between two rounded convex beads, and the other, in FIGS. 6–8, having a rounded off-center head adjacent one side face of the work with a cove at the base of the head at its opposite side. Other well known designs of work, equally adapted to receive a permanent laminate covering when operated upon according to this invention, are suggested in FIGS. 9 and 10. These illustrated designs are typical of many with which the machine of this invention may be advantageously employed to perform the postforming operations of conforming and bonding the laminate to the core faces which are to be covered permanently thereby.

Figure 3:
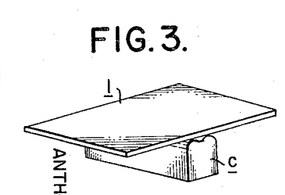
Figure 4:
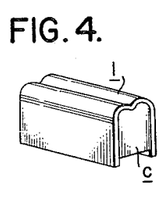
FIG. 4 which is a view similar to FIG. 3, shows the work as it appears immediately after the laminate is conformed and bonded to the top and side faces of the core.
Figure 5:
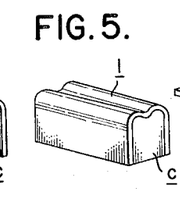
FIG. 5, also a view similar to FIG. 3, shows the work completed after excess material has been removed from opposite edges of the laminate whereby they are terminated flush with the bottom face of the core.
Figure 6:
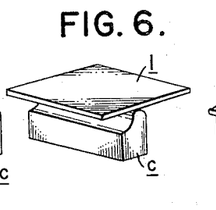
FIG. 6, which is a view similar to FIG. 3, illustrates another example of work whose core is asymmetrically profiled to provide an off-center head extending through a curve of nearly 180 degrees to merge at one side with the adjacent side face of the core, the opposite side of the head at its base merging with a cove which extends to the proximate side face of the core, this view also showing a strip of laminate resting upon and affixed to the crown of the head, the work being then in the required condition for placement in the machine for operational treatment thereby.

At the starting end of the machine is a receiving zone extending through the area between the dot-dash lines $u$ and $v$ (FIG. 1), and it is here that the work is first deposited horizontally with its profiled, laminate-bearing, top face uppermost. Advance of the work lengthwise of itself and of the machine then starts, proceeding successively through a heating zone (the area between the $v$ and $w$ lines), a forming or bending zone (the area between the $w$ and $x$ lines), a bonding zone (the area between the $x$ and $y$ lines), and a trimming and delivery zone (the area between the $y$ and $z$ lines). The perspective views, FIGS. 3–5, show the condition of the work as it appears progressively at the start, during and when completed, as the result of successive operations thereon by agencies within the three zones wherein forming, bonding and trimming are performed. Most of the operating agencies are duplex in that they comprise duplicate units arranged in two parallel rows on opposite sides of the path along which the work is advanced. In the detailed description to follow, the reference characters applied to each such unit on one side of the advancing work will be duplicated for designating like units on the opposite side thereof, but with a prime (') added thereto.

Figure 26:
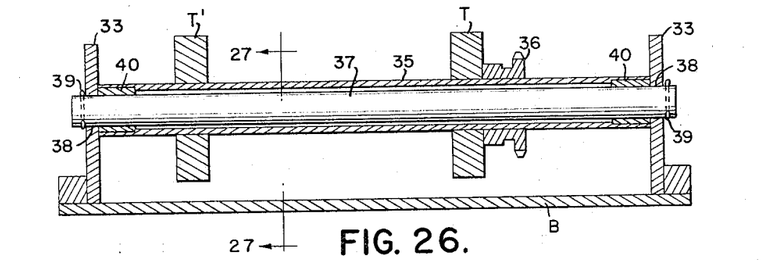
FIG. 26 is a transverse section through the machine, taken on line 26—26 of FIG. 11, showing details of the shaft assembly whereon a pair of traction wheels is carried.

Through the fixed path between the two rows of operating agencies are diametrically aligned a number of like traction wheels T whose peripheral tops are tangential to a common plane. The work which is concurrently rested upon knurled peripheries of several of these wheels is adapted to be longitudinally advanced thereby in response to rotation thereof. Each wheel is carried fast, as by a pressed fit, upon a rotatable shaft 35 as is an adjacent sprocket wheel 36 having a side hub to assure a fixed spacing therebetween (FIG. 26). As shown, these shafts which are tubular extend crosswise of the machine, arranged in parallelism within a common horizontal plane. Support for each shaft is furnished by a rod 37 extended therethrough and beyond its ends to rest within openings 38 provided for this purpose through the walls 33. End portions of each rod extend slightly beyond the exterior faces of these walls where they are circumferentially grooved to receive resilient cotter pins 39 whereby to provide a removable lock for preventing rod axial movements. Seated with a pressed fit within the tubular shaft adjacent each of its ends which abut the interior face of the proximate wall 33, is a bearing 40 of bronze or the like which rotatably engages the rod while holding the tube and rod slightly separated to minimize frictional resistance therebetween.

Figure 27:
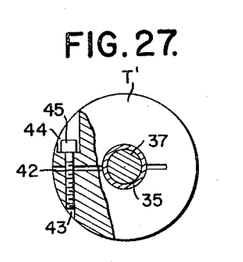
FIG. 27 which is a sectional view, taken on line 27—27 of FIG. 26, shows the same assembly together with one of its traction wheels which is partly broken away to exhibit certain features of its construction.

A second traction wheel T' may also be carried on each shaft 35 to cooperate with the first wheel T in propelling work which is wide enough to require, or benefit from, support additional thereto. The wheel T' is split diametrically at 42 (FIG. 27) for a distance somewhat greater than its radius whereby to acquire freedom for expansion to a slight degree. It is also centrally apertured for coaxial mounting on the shaft 35. Within its body, transversely of the radial split, is formed a chord bore 43 open at its ends at spaced points upon the wheel periphery. One end portion 44 of this bore is counterbored to accommodate the head of a bolt 45 whose shank is adapted to enter the opposite tapped end portion of the bore to engage therewith. When the bolt is rotatively advanced, the wheel is clamped fast upon its supporting shaft, but when oppositely rotated the wheel is free to release its tight hold thereon to permit any desired adjustment axially thereupon. Assembly of the rod, shaft and wheels just described is simple, its installation in the machine is readily performed, and adjustment of the wheels thereon, before or after installation, to provide multiple moving supports for work varying widely in width, is a facile operation.

A unidirectional rotation of all traction wheels in unison is provided by a chain system which transmits power simultaneously to all sprocket wheels 36. As shown best in FIGS. 2 and 20, this end is achieved by one endless chain C which travels over and engages the several sprocket wheels in the receiving and heating zones, i.e., within the areas between the dot-dash lines $u$ and $w$ (FIG. 1), also around two idler sprocket wheels 48 and 49 located near opposite ends of these zones. The sprocket wheel 48 is supported slightly below the base 30 by a bracket 50 depending therefrom, the remaining wheel 49 being carried by a supporting bracket 51 extending outwardly beyond the base of the machine at its receiving end (FIG. 1). Through an opening 52 in the base above the sprocket wheel 48 the chain C passes down from the proximate sprocket wheel 36 to turn around the idler sprocket wheel 48, then proceeds through a lower run toward the end idler sprocket wheel 49 around which it travels to form an upper run and then advances oppositely over each of the sprocket wheels 36 which are aligned in its path, thereby rotating at uniform speed all traction wheels T and T' on the several shafts 35 in these two zones of the machine.

Arranged in tandem with this endless chain is a second such chain C' which travels over and engages the several sprocket wheels 36 in the bending, bonding and trimming-delivery zones, i.e., within the area between the dot-lash lines $w$ and $z$ (FIG. 1), also around two idler sprocket wheels 55 and 56 located near opposite ends of these zones. The sprocket wheel 55 is supported slightly below the base B by a suitable bracket 57 depending therefrom, the remaining sprocket wheel 56 being mounted upon the driven shaft 58 of a gear reduction system within a housing 59 (FIG. 12) suspended from an extension 60 of the machine base at its delivery end. A motor 61, also suspended therefrom, transmits power through the reduction gears to the sprocket wheel 56 to operate the chain C', a switch 62 for controlling the motor being mounted upon the front of the machine at a point convenient for manual operation (FIG. 1). Through an opening 63 in the base, above the sprocket wheel 55, the chain C' passes upwardly to the proximate sprocket wheel 36 to turn around in the form of an upper run which proceeds toward the delivery end of the machine and in so doing engages with all sprocket wheels 36 which are aligned in its path. After passing the last of these sprocket wheels, the chain turns downwardly toward the end sprocket wheel 56 around which it travels to form a reversing moving lower run which ends when a turn around the idler sprocket wheel 55 is made. All of the sprocket wheels 36 thus engaged by the upper run of the endless chain C' are rotated in unison thereby, a like rotation of all traction wheels T and T' on the same shafts being produced concurrently.

Figure 12:
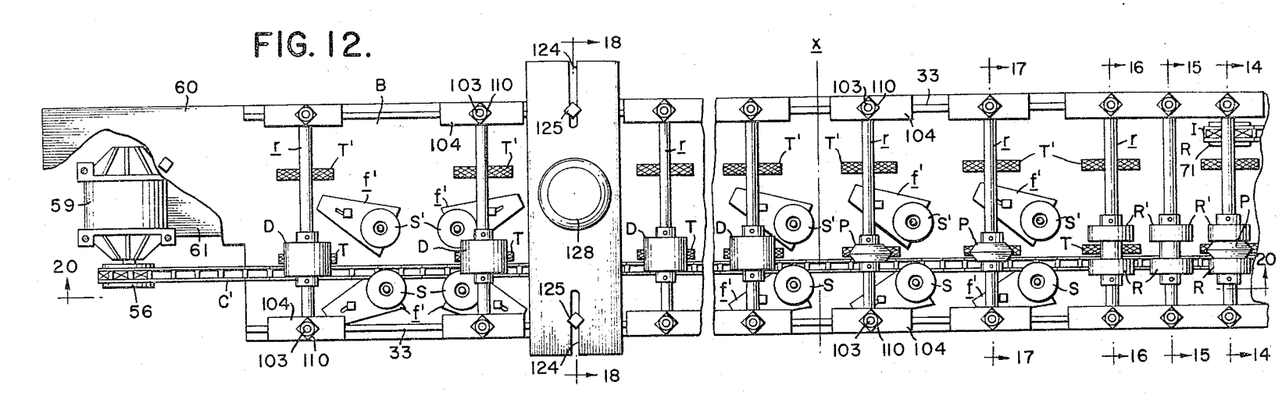
FIG. 12, which is a view similar to FIG. 11, shows the principal operating units comprised in its bending, bonding and trimming zones.
Figure 20:
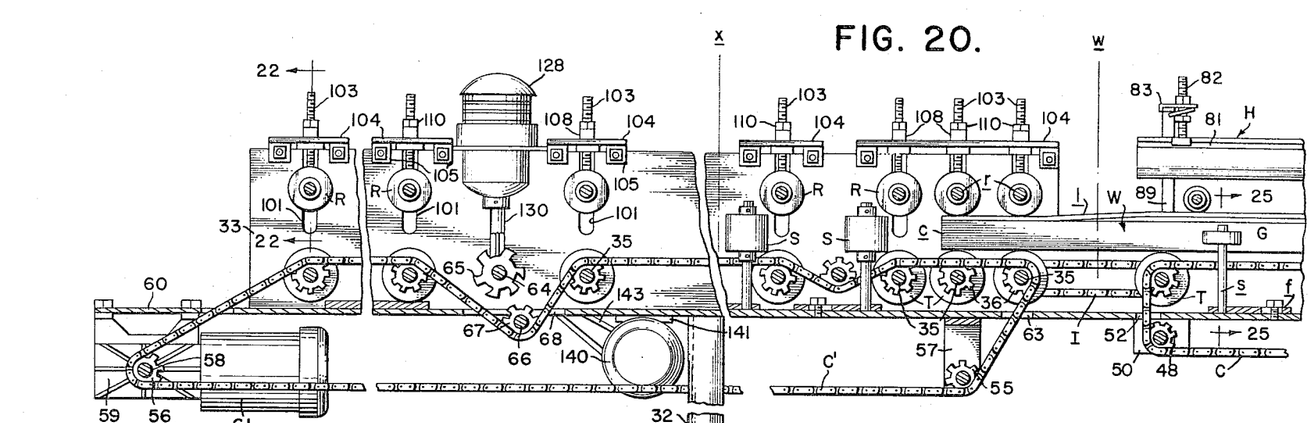
FIG. 20 is a fragmentary longitudinal vertical section through portions of the machine in its heating, bending, bonding and trimming zones, the section being taken on line 20—20 of FIG. 12, with various of the operating units omitted in the interest of clarity.

In the bending or forming zone, between the dot-dash lines $w$ and $x$, the work encounters a maximum of frictional resistance to its continued advance through the machine. Here the traction wheels supporting the work are grouped together more closely than elsewhere (FIGS. 12 and 20). It is important that this enhanced resistance to work travel be not permitted to force disengagement of the chain C' from the sprocket wheels 36 at this vulnerable point where contact between the chain and sprockets is limited to a shorter arcuate distance than elsewhere. Any such tendency is effectively counteracted (1) by locating the idling sprocket wheel 55 below these closely-grouped sprocket wheels in the forming zone, whereby the chain C' is required to execute a turn of 90 degrees or more, involving its engagement for a like distance with the first sprocket wheel 36 to which it transmits a driving force after passing upwardly through the base opening 63; and (2) by deflecting the chain downwardly, when leaving the last of the closely-grouped sprocket wheels 36 in the forming zone, to pass under the next adjacent sprocket wheel 36 (see FIG. 20) en route to the sprocket wheel 36 therebeyond, thereby increasing appreciably the arcuate distance of engagement between the chain and the last sprocket wheel 36 in the forming zone group. By requiring the chain C' to change its direction of movement at the two points just noted, I provide adequately against any break in its driving connection with two of the sprocket wheels 36 offering maximum resistance to rotation, thereby assuring an indefinite continuity in its operation.

Figure 11:
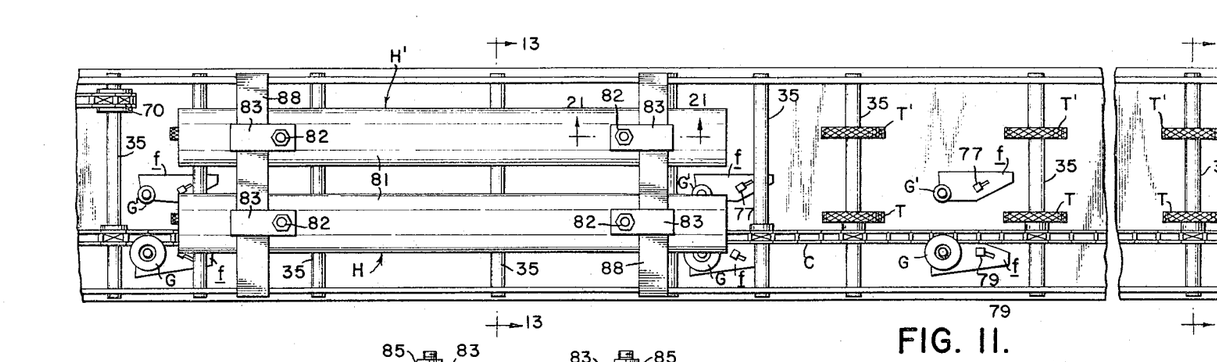
FIG. 11 is a fragmentary top plan view of the machine, showing certain of the operating units comprised in its receiving and heating zone.

Within the trimming zone is a rotatable cross shaft 64 (to be further described later) which lies between two adjacent traction wheels 36 in the same horizontal plane. This shaft mounts a circular cutter 65 of hard durable material, formed with peripheral teeth $t$ which stand in the path of work moving through the machine and in position to engage tangentially with the bottom face thereof. It is necessary that the upper run of the chain C' be locally deflected downwardly to avoid interference with this cutter, as by mounting, on the undersurface of the base B, a shaft 66 upon which is idly carried a sprocket wheel 67, and leading the chain around and under this sprocket wheel at this one point (FIG. 20). Since deflection requires that the chain pass through the base B at two closely spaced points, a single elongated slot 68 is formed therethrough for its accommodation. The two chain systems just described are linked by an endless intermediate chain I (FIG. 20) which passes over and around extra sprocket wheels 70 and 71 (FIGS. 11 and 12) carried fast on the two shafts 35 which are disposed oppositely of the line $w$ arbitrarily dividing the heating and bending zones. By this means the two chain systems C and C' are interconnected for concurrent operation to assure rotation of all traction wheels T and T' in unison, with the work supported thereon propelled thereby uninterruptedly through all zones of the machine.

Figure 25:
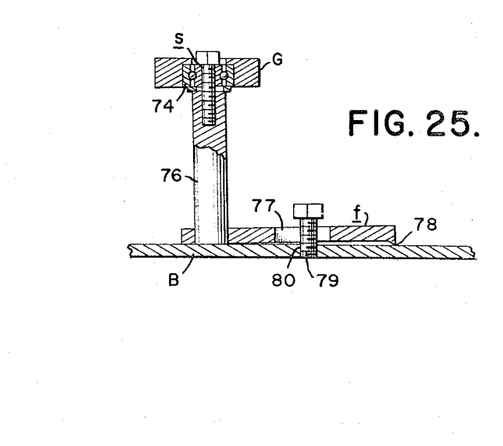
FIG. 25, which is an enlarged fragmentary section, taken on line 25—25 of FIG. 20, shows in detail one of the guide roll units of which several, arranged oppositely of each other in pairs, are adjustably mounted on the machine base in its receiving and heating zones.

Guiding supports for the work, while initially advancing upon the rotating traction wheels, are furnished by a pair of rolls G and G' engaging opposite faces of the core. As best shown in FIG. 25, each roll, produced from steel or the like, is frictionlessly mounted upon ball bearings 74 for rotation about a spindle s which is axially extended from the upper end of a post 76 upon which the rod is supported at a fixed elevation. This post upstands from a point near one end of an elongated foot plate f wherein is formed a slot 77 in general alignment with the post. Downturned edges and/or corners 78 of the foot plate may be employed to provide a 3-point support therefor. Through the slot 77 is extended a bolt 79 having a threaded shank adapted for engagement with the threads of a tapped hole 80 in the machine base B, the bolt head then overlying adjacent portions of the top face of the foot plate for pressure engagement therewith when the bolt is rotatively advanced for this purpose. By the means described, each roll G and G' may be adjusted, within limits, to any selected position toward or from the work and be locked therein to engage firmly with the work whereby to cooperate with the companion roll oppositely thereof in guiding the work through the machine in a fixed path while being advanced in response to rotation of the traction wheels T and T'. A number of guide rolls similar to these just described are arranged oppositely of each other in pairs within the receiving and heating zones; but elsewhere, commencing with the bending zone, are replaced by other work-engaging side rolls S and S' presently to be described.

Figure 21:
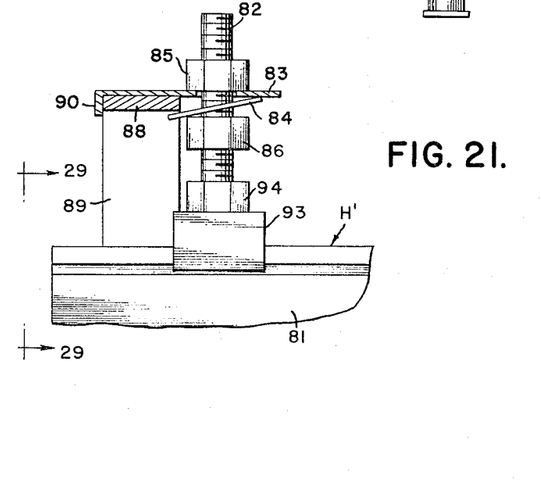
FIG. 21 is an enlarged fragmentary detail in vertical section of one of the adjustable heater supporting means, taken on line 21—21 of FIG. 11.

Within the heating zone, between the dot-dash lines v and w (FIG. 1), are two side-by-side heating units H and H' each comprising an elongated enclosing reflector 81 suspended from a pair of widely spaced threaded rods 82 on each of which are mounted two clips 83 and 84 between a pair of nuts 85 and 86 (FIG. 21). These clips are mounted to engage upper and lower faces of a cross arm 88 which is carried at an elevated point above the machine base B upon upright supports 89. The upper clip 83 is flanged at 90 to hook over the far edge of the cross arm, and both clips are free to shift relative thereto endwise thereof, without disengagement therefrom, when relaxed for this purpose by proper adjustment of the nuts 85 and 86. When so shifted, the suspended heater unit is also moved toward or from the longitudinal center of the machine; when rotatively adjusted otherwise, however, the clips may be frictionally locked to the cross arm 88 whereby to secure the heater fixedly in position. By proper adjustment of these nuts, also, the height of each heater unit H and H' may be varied within considerable limits.

Figure 29:
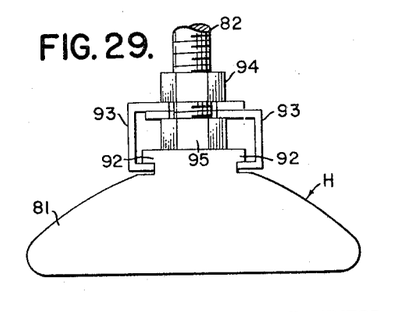
FIG. 29 is a fragmentary view in elevation, looking toward one end of a heating unit, as indicated by the line 29—29 of FIG. 21, showing one of the supporting connections for the suspended heaters whereby their vertical and longitudinal positions may be readily adjusted.

Referring to FIG. 29, the reflector 81 of each heater unit is shown as formed at its top with a pair of oppositely disposed, longitudinally extending, coplanar flanges 92 with which a pair of L-shaped clips 93 are adapted to engage. Each clip is formed with an upper leg overlapping the other, and through holes therein, adapted to register when the clips are engaged with the flanges 92, to receive one of the supporting rods 82 each of which is provided with a head 94 at its lower end. A nut 95 applied to this rod may be rotatively advanced toward the head 94 to clampingly engage therebetween opposite faces of the overlapping upper legs of the two clips to secure them frictionally to each other. When so secured, the clips are then engaged similarly with the flanges 92 of the reflector 81 whereby its longitudinal position relative to each supporting rod 82 becomes fixed. A means is thereby provided for limited adjustment in the longitudinal position of each reflector, supplementing the adjustable mounting for the supporting rods 82 (FIG. 21) by which the heating units may be shifted crosswise of the machine toward or from each other.

Excellent results may be obtained from infra red heaters having double elements when fixedly mounted within the reflectors which are continuously open lengthwise thereof directly over the work during its advancing movement through this zone of the machine. When properly adjusted relative to the work, all portions of the laminate may simultaneously be subjected to a concentration of heat rays emitted from the two heaters, or either of them separately as the case may be, for a time interval which is determined in part by their length, which may be a few or many feet, and in part by the operating continuity of the heaters. The former is affected by the speed of travel of the work past the heaters and the latter by a cycling input controller 96 (FIG. 1) electrically connected with the two heating units H and H' so that, when set to a desired percentage of off and on time, the temperature of each heater may be controlled independently of the other, as best required for the type of laminate material comprised in the work W. The heating treatment so applied to the laminate is a first stage in the operations performed by the present machine on the work passing therethrough. It produces a flexibilizing of the laminate, extending throughout its free edge portions, which are thereby rendered amenable to bending and forming—an operation which immediately follows in the next succeeding stage of the work advance.

Figure 13:
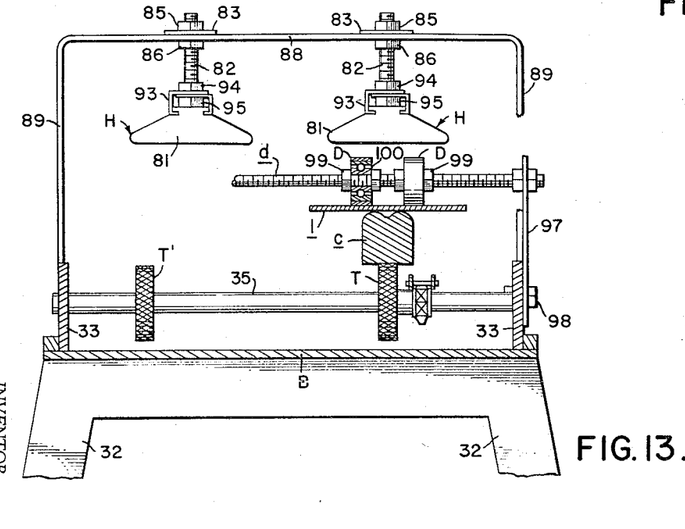
FIG. 13 is a transverse section through the machine, taken on line 13—13 of FIG. 11.

A pair of hold-down wheels D and D' within the heating zone is idly carried upon a horizontal rod d extending transversely over the work in position to engage therewith. As shown in FIG. 13, this rod is supported at one end by an upright arm 97 which is affixed to one of the machine walls 33 by bolts 98 or otherwise. The hold-down wheels are secured in a fixed position axially of the rod to engage the flat laminate strip l at a desired point, as by means of a pair of nuts 99 each of which is screw threaded on to the rod for engagement with the hub-element of a ball bearing support 100 for one of the wheels D or D'. Since these hold-down wheels are required to operate in a high temperature zone, they are desirably made of steel or the like. They are called upon to apply only a light pressure upon the work at this point, consequently a single arm support for the rod will suffice.

Figure 22:
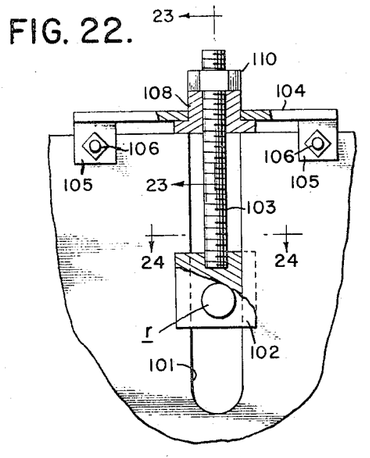
FIG. 22 is a similar view of one of the adjustable mountings for the rods whereon the forming, hold-down, and other rolls are idly carried, taken on line 22—22 of FIG. 20.

Throughout the machine there are various wheels P and/or forming rolls R and R' engaging the work from above, all idly carried on cross rods r having similar adjustable mountings. As best shown in FIGS. 2 and 22, each side wall 33 of the machine is formed with a plurality of downwardly extending vertical slots 101 which are open at the top, one slot in each wall being provided for each rod. Slidingly fitted into each slot is an H-block 102 which is free for vertical adjustment therein. A horizontal hole in each block is adapted to receive the proximate end portion of one rod r which may be threaded or otherwise secured therein. A second hole which is also formed in each block extends downwardly from its top face to provide an anchorage therein for the lower end portion of a threaded post 103 which upstands therefrom within the space defined by the slot 101 to terminate at a point thereabove. Fitted over the top edge of each wall 33 at a point oppositely of each slot therein is a strap 104 having a pair of spaced ears 105 depending therefrom adjacent each end thereof to straddle the wall, these ears being apertured for reception of a bolt 106 which traverses also a further aperture through the wall. Each of the two bolts is thus extended through both ears of the strap at one end thereof, also the side wall of the machine, thereby fixedly securing the strap in place thereupon.

Through each strap is an opening aligned with the axis of the vertical post 103 and somewhat greater in diameter to receive therethrough a sleeve 108 having at its lower end an out-turned flange 109 which engages the under face of the strap. A nut 110 is fitted on to the upper end portion of the post so as to engage with the upper face of the strap. By the means described, each nut, when rotated, will raise or lower the post, and with it the rod r, thereby fixing the lower limit to which the supported wheels P and/or rolls R may descend when in floating engagement with the top face of the work.

When leaving the heating zone to enter the bending zone which lies in the area between the dot-dash lines $w$ and $x$ (FIG. 1), all portions of the laminate are conditioned for bending into close conformity with the contour of the top and side faces of the core. In the example illustrated in FIGS. 3–5, the core top face profile is centrally fluted longitudinally of the work between two convex beads. To conform closely to such a profile, the flat laminate strip $l$ in its central portion must also be inwardly bent to occupy the fluted depression in the core. For this purpose, I provide one or more specially profiled wheels P of steel or the like, also several pairs of resilient forming rolls R and R', spaced apart rather closely lengthwise of the bending zone, all carried idly upon rods $r$ which are adjustably supported as described above. The two rolls in each pair are held in fixed axial positions between a pair of adjustable collars 112 which are locked to the rod $r$ by set screws 113 adjustable for this purpose, a spacer 114 being placed between the rolls to separate them the desired distance.

Figure 14:
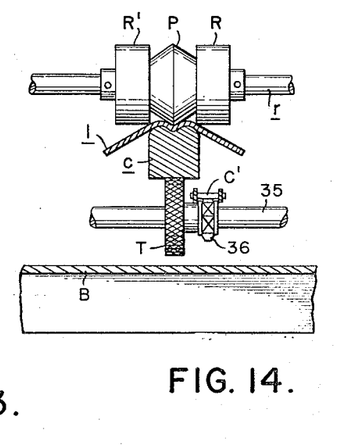
FIGS. 14, 15, 16 and 17 are fragmentary sectional views, taken on lines 14—14, 15—15, 16—16 and 17—17 of FIG. 12.
Figure 15:
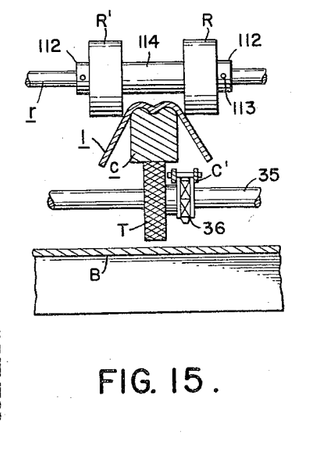

Between the pair of forming rolls R and R' which is first to engage the work (FIG. 14), there is also fixedly positioned one of the wheels P having a special peripheral contour for operating upon work which is profiled as per FIGS. 3–5. The maximum diameter of this wheel is at its axial center where it is profiled complementary to the fluted center depression in the top face of the core $c$, when aligned therewith. With the supporting rod $r$ adjusted properly, this profiled wheel will engage the passing work with a pressure sufficient to force its flexibilized laminate $l$ downwardly into the fluted center of the core $c$ (FIG. 14), concurrently with the application of downward pressure from the forming rolls R and R' upon the laminate at points outwardly of the core side faces, whereby to force the laminate portions overlying the core beads into close conforming engagement therewith, resulting also in an initial bonding of the laminate around the rounded juncture of the top and side faces of the core (FIG. 15).

Figure 8:
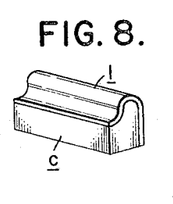
FIG. 8, also a view similar to FIG. 6, shows the work completed with excess material removed from opposite laminate edges one of which terminates flush with a side face of the core and the other flush with the bottom face thereof.
Figure 9:
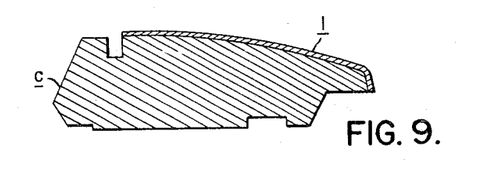
Figure 10:
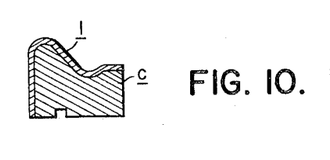
FIG. 10 is a view similar to FIG. 9, showing another asymmetrical example of work piece having both an off-center head and a concave gutter adjacent thereto.
Figure 16:
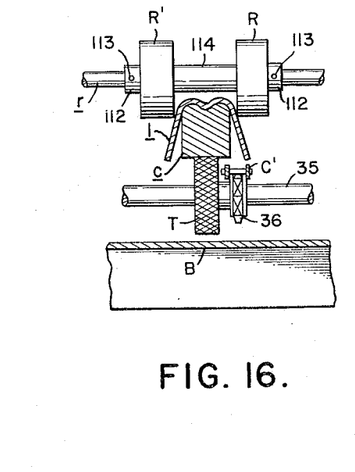
Figure 17:
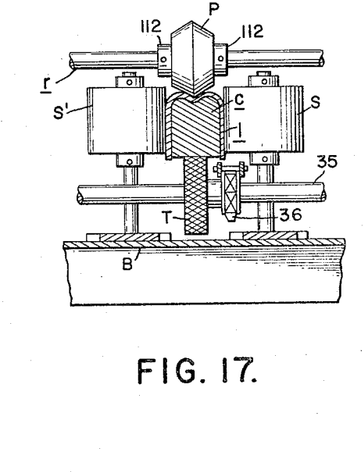

The inclusion of a profiled wheel P along with forming rolls R and R' on the same rod $r$ may not always be necessary or desirable. As shown in FIGS. 15–16, the second and succeeding pairs of forming rolls R and R' are each separated by a spacer 114 whereby they may engage only with the laminate edge portions which are still free so as to deflect them downwardly against opposite side faces of the core $c$. The working face of each such roll may be beveled or otherwise profiled for most effective forming engagement with the work, depending in large part upon the cross-sectional contour thereof. As one example of a different profile, see FIGS. 6–8; others are also indicated in FIGS. 9 and 10. The number of pairs of forming rolls R and R' to be successively used is also optional within certain limits, several such pairs, after the first to engage the work, being suggested in FIG. 1. Before leaving the bending zone, it is expected that the laminate free edge portions will be conformed generally, but not necessary finally, with the side faces of the core, and with the proper axial and vertical adjustments of the forming rolls the attainment of this objective will be assured. Beyond the bending zone, one or more profiled wheels P may be idly mounted to further engage the profiled top face of the work whereby to hold the laminate closely against the core thereat for additional periods of time to assure a permanent bonding of the newly-formed fluting therein (FIG. 12.) In lieu of the collars 112, each of the wheels may be provided with a hub through which is extended a set screw for rotative advance into locking engagement with the rod $r$ to fix the wheel in a desired axial position.

Figure 28:
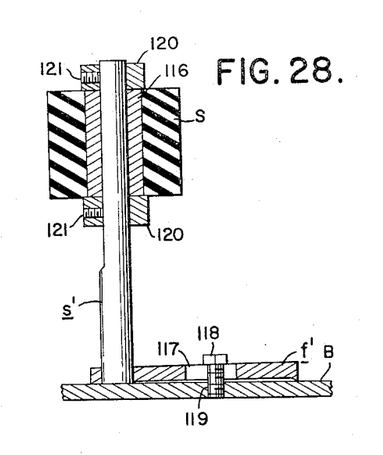
FIG. 28 which is a view much the same as FIG. 25, shows one of the work-engaging side roll units of which a considerable number, arranged in pairs oppositely of each other, are adjustably mounted on the machine base at spaced points throughout its bending, bonding and trimming zones.

Plural sets of resilient rolls S and S' are also arranged to engage opposite side faces of the work, either with a bare face of the core or with a laminate edge portion which has been conformed thereto. Each of these rolls (FIG. 28) is tightly fitted around an axial bushing 116 of bronze or the like which is rotatably carried upon a mounting unit much the same as that already described in connection with the guide rolls G and G' (FIG. 20). As shown, this unit comprises a spindle $s'$ upstanding from a foot plate $f'$ wherein is an elongated slot 117 through which a bolt 118 is extended for threaded engagement with a tapped hole 119 in the base B. Adjustment of such a mounting, whereby the roll carried thereby may be moved toward or from the work and locked in any position therebetween, may be readily made. The roll is adjustably supported in a fixed axial position of adjustment as by means of a pair of collars 120 mounted upon the spindle $s'$, one opposite each end of the roll, a set screw 121 being extended radially through each collar for rotative advance into firm engagement with the spindle to lock therewith. These rolls are provided at spaced intervals throughout the bonding and trimming-delivery zones not merely to continue guiding the work in its movement through the machine but, more importantly, to exert a continuing pressure against the newly conformed laminate portions through the stages immediately following the heating and forming operations. All conformed portions of the laminate are thereby maintained in intimate contact with the core throughout the period required for a complete and permanent bonding of one to the other.

Figure 7:
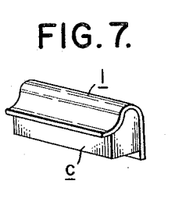
FIG. 7, which is a view similar to FIG. 6, shows the work as it appears immediately after the laminate is conformed and bonded to the head of the core and to the adjacent side face thereof.
Figure 18:
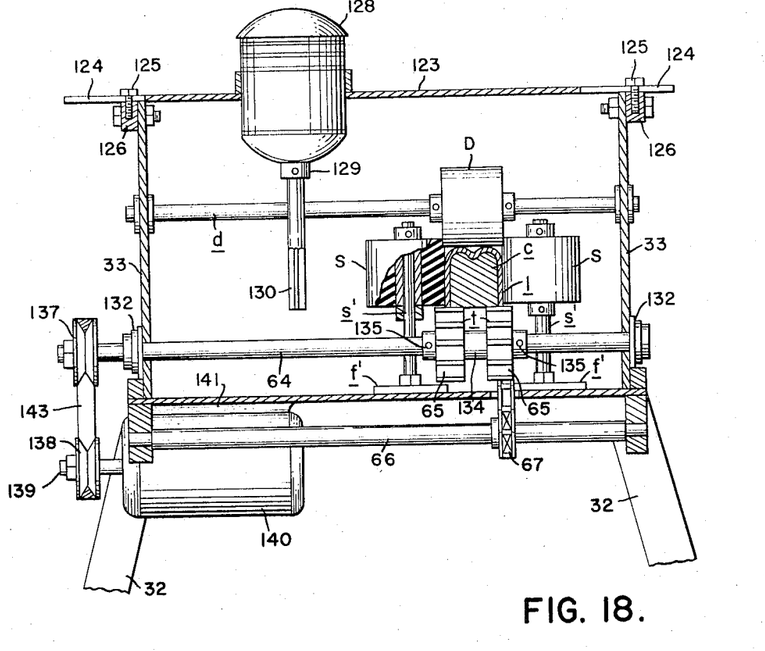
FIG. 18, which is a transverse sectional view taken on line 18—18 of FIG. 12, shows in the trimming zone of the machine a piece of work profiled according to FIGS. 3–5.
Figure 19:
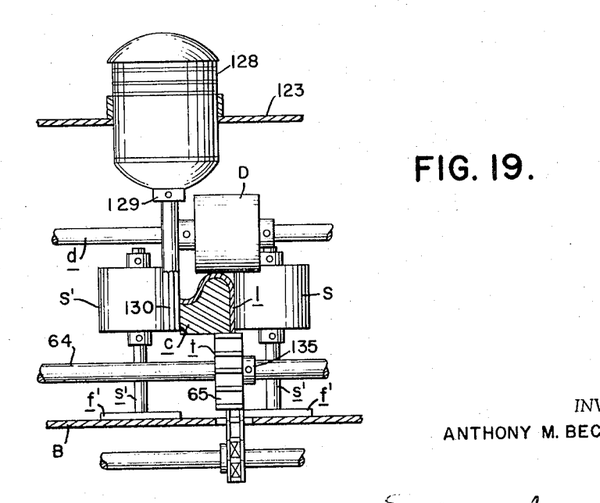
FIG. 19, which is a fragmentary sectional view similar to FIG. 18, shows the work therein to be profiled according to FIGS. 6–8.

When ready to leave the bonding zone, a conformed application of the laminate to the core will have been completed, all except for trimming of excess laminate material from the work. This is customarily required because of the common practice, when cutting the laminate into strips for application to elongated core pieces, of allowing a little extra for the width so that complete coverage of all desired core faces may be assured. In work having a fluted top face, where the laminate coverage includes opposite side faces of the core as well, there will be some excess of material to be removed from opposite side edges of the laminate, both of them adjacent the core bottom face (FIGS. 4 and 18). Other contours of work may involve excess laminate material projecting beyond a side face of the core and/or also its bottom face (FIGS. 7 and 19, for example). A final operation of trimming then remains to be attended to, this being performed immediately following emergence of the work from the bonding zone and its entry into the trimming zone which lies between the dot-dash lines $y$ and $z$ (FIG. 1).

Figure 23:
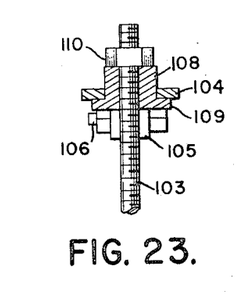
FIGS. 23 and 24 are fragmentary sectional details thereof, taken on lines 23—23 and 24—24 of FIG. 22, respectively.
Figure 24:
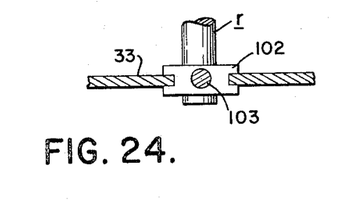

While advancing toward and through the trimming zone to its point of delivery, the work is desirably guided and steadied by additional side rolls S and S' (FIGS. 12 and 18), also in the same area by hold-down rolls D of suitable material such as metal, a resilient composition, etc., which are idly carried on rods $d$ having floating mountings therefor the same as already described (FIGS. 22–24). Intermediately of certain of the cross rods $r$ in the trimming zone is a bridge 123 supported upon the walls 33 to transversely span the machine above the work, the bridge being provided at opposite ends with aligned slots 124 for reception therethrough of vertically disposed bolts 125 to permit the bridge to be shifted endwise free of interference therefrom. The shank of each bolt is adapted to engage a tapped opening in a block 126 affixed to a side wall 33 exteriorly thereof adjacent its top edge (FIG. 18). When rotatively advanced, the bolt head will engage the top face of the bridge to frictionally lock it in a selected position of adjustment transversely of the machine.

Mounted upon the bridge intermediately of its ends is a motor 128 having a depending drive shaft equipped with a coupling 129 connecting fast with the shank of a router 130, or other like trimming tool, which is thereby rotated about a vertical axis through a circle that is tangential to a side face of the work. A switch 131, affixed to the front of the machine (FIG. 1), controls operation of the motor which may be left running continuously when the work so requires. As work is advanced past the trimming tool 130, any excess of laminate material projecting beyond the adjacent side face of the core is cut off flush therewith (see FIG. 19).

The shaft 64 whereon the circular cutters 65 are carried is desirably tubular and part of an assembly the same as illustrated in FIG. 26, and with like end bearings therefor (FIG. 18). For trimming excess material from a single edge of the laminate *l* adjacent the core bottom face, a single cutter 65 will suffice (FIG. 19); for two such edges (FIG. 18) a pair of the cutters will be required, held fixedly apart as by an intervening spacer 134 fitted on to the shaft 64. The vertical height of this shaft is such that the circle defined by the rotating cutter teeth *t* will be tangential to the bottom face of the work. As by means of a set screw 135 radially extended through a laterally projecting hub on each cutter, the shaft 64 may be firmly engaged to lock the cutter in a fixed axial position of adjustment. This shaft is extended through one of the side walls 33 to carry fast thereon a pulley 137 in the same radial plane as a second pulley 138 which is mounted fast on the drive shaft 139 of a motor 140 fixedly supported below the machine base B by a bracket 141 suitable for the purpose. A control switch 142 for this motor is shown to be mounted on the front of the machine (FIG. 1). An endless belt 143 extending between the two pulleys drives the shaft 64 to rotate the toothed cutter or cutters thereon. The work, upon passing through and beyond the trimming cutters, then lies free upon the base B at the delivery end of the machine, ready for removal therefrom for transfer to a desired destination.

Preparation of the machine for operation will involve an initial alignment of all guide and side rolls G and S at a point which is relatively close to and parallel with the chain systems C and C'. This adjustment, once made, will normally remain permanent since these several rolls define, in effect, a line which coincides with the proximate edge of the fixed movement path of elongated work whose transverse dimensions may vary widely. The companion set of rolls G' and S' may have to be adjusted properly for each new run of work to be processed, depending upon its shape and width. Since it is common production practice to first accumulate, and then process a large volume of like work pieces, adjustment changes in the guide and side rolls will be relatively infrequent. For work which is cross-sectionally different, there may have to be some minor changes in the axial positions and contours of the rolls and wheels operating upon the work from above. This will depend, in part, upon whether the differences are such as to require new adjustments thereof. The vertical height of all shafts whereon such rolls and wheels are carried, also the horizontal and vertical positions of the heaters H and H', may also have to be altered somewhat. All such adjustments, which involve only routine attention by attendants familiar with the machine and its requirements, are simple and facile of performance due, in part, to the many improved features of construction incorporated into the mountings therefor as hereinbefore described.

Considering the present machine as a whole, two features in particular are to be noted: (1) the frictionless travel of the work during its processing and (2) the resilient and/or floating contact with the laminate of the several agencies which operate upon it immediately after it has become flexibilized. These are important desiderata because of vulnerability of the laminate, when heated and softened, to the reception of marks or scratches upon its surface. Protection is here furnished to the work undergoing processing by the nature and/or mounting of the freely-idle rolls and wheels which engage the laminate along the top and/or side faces of the core. The term "resilient" as used herein to described the rolls has reference to any of the well-known materials of the present time, such as a rubber composition whose surface is continuous, smooth and true, and which, together with its body, is highly resistant to wear and disintegration while maintaining a desirable degree of yieldability and resiliency. With such properties inherent in the processing agencies herein employed, and mountings therefor which control their pressure contact with the softened laminate to a point which is both safe and effective, the machine of this invention may be dependably used for volume postforming of various plastic laminated products.

What is claimed is:

1. A postforming machine of the kind described wherein a laminate strip, conditioned for pressure-bonding and applied flatwise to the top face of an elongated core, is to be conformed and bonded thereto while the work is advanced lengthwise of itself through the machine, comprising means for propelling the work through a fixed path lengthwise of the machine, means for heating the laminate strip to a flexibilized state, means engaging the flexibilized strip for conforming and bonding the laminate to the top face of the core comprising a plurality of idling rolls of smooth resilient material adapted, when contacting the flexibilized core, to move tracelessly and freely therewith, and means positioned along opposite sides of the movement path of the work and adjustable relative thereto for continuous frictionless engagement with the work to maintain the same fixedly in the path of movement prescribed therefor.

2. A postforming machine according to claim 1 wherein the propelling means comprises a plurality of traction wheels diametrically aligned lengthwise of the machine and mounted for rotation with their axes transversely thereof and their peripheral tops disposed in a common horizontal plane to provide a succession of rests upon which the work may be progressively supported at a plurality of spaced points, and means interconnecting all of the wheels for unidirectional rotation and in unison whereby to propel the work supported thereon lengthwise of the machine.

3. A postforming machine according to claim 1 wherein the propelling means comprises traction wheels arranged in two diametrically aligned sets which are parallel with each other and extended lengthwise of the machine, all of the wheels being mounted for rotation with their axes transversely of the machine and their peripheral tops disposed in a common horizontal plane to provide a succession of rests in two rows upon a plurality of which the work may be concurrently supported at spaced points, and means interconnecting all of the wheels in both sets for unidirectional rotation in unison whereby to propel the work supported thereon through the machine lengthwise thereof.

4. A postforming machine according to claim 1 wherein the propelling means comprises a plurality of parallel shafts mounted for rotation about axes crosswise of the machine, a traction wheel and a sprocket wheel are fixedly carried on each shaft to rotate therewith, all of the traction wheels being diametrically aligned lengthwise of the machine and all of the sprocket wheels being similarly aligned, the peripheral tops of the traction wheels being disposed in a common horizontal plane to provide spaced rests upon a plurality of which the work may be supported and advanced in response to rotation thereof, and a power-driven chain system in driving connection with each sprocket wheel to rotate all of the traction wheels unidirectionally and in unison whereby to advance the work supported thereon.

5. A postforming machine according to claim 1 wherein the propelling means comprises a plurality of traction wheel-sprocket wheel units in driving coaxial connection with each other, all of said traction wheels being diametrically aligned lengthwise of the machine with their axes transversely thereof and their peripheral tops in a common horizontal plane to provide spaced rests upon a plurality of which the work may be supported and advanced in response to rotation thereof, a cross shaft whereon each unit is fixedly mounted for rotation therewith, and a power-driven chain system in driving connection with each sprocket wheel to rotate all of the traction wheels unidirectionally and in unison whereby to advance the work supported thereon.

6. A postforming machine according to claim 1 wherein the top face of the core is profiled with a longitudinal depression, a forming wheel having a smooth surface periphery is profiled to complement the depression in the core top face and, when engaged with the flexibilized laminate thereover, to depress the laminate thereinto, and a mounting whereon the wheel is idly carried acting to exert a gravity pressure upon the laminate for conformation thereof.

7. A postforming machine according to claim 1 wherein the top face of the core is profiled with a longitudinal depression in one portion thereof, and a wheel having a smooth surface periphery is profiled to complement the depression in the core top face and, when engaged with the flexibilized laminate thereon, to depress the laminate thereinto for conformation therewith.

8. A postforming machine according to claim 1 wherein the conforming and bonding means comprises a plurality of idling rolls of smooth resilient material mounted to exert upon the flexibilized laminate a gravity pressure for a traceless conformation thereof.

9. A postforming machine according to claim 1 wherein the conforming and bonding means comprises a plurality of idling rolls of smooth resilient material mounted to exert upon the flexibilized laminate a gravity pressure for a traceless conformation thereof, there being means to limit such pressure to a selected point short of gravity.

10. A postforming machine of the kind described wherein a laminate strip, conditioned for pressure-bonding and applied flatwise to the top face of an elongated core, is to be conformed and bonded thereto while the work is advanced lengthwise of itself through the machine, comprising a plurality of traction wheels diametrically aligned lengthwise of the machine and mounted for rotation with their axes transversely thereof and their peripheral tops disposed in a common horizontal plane to provide a succession of rests upon which at a plurality of spaced points the work may be progressively supported and propelled in a fixed path, means in a first zone for heating the laminate to a flexibilized state while under propulsion, means in a second zone moving synchronously with the work for applying frictionless pressure to the flexibilized laminate to produce a conformation thereof to the core while propulsion of the work continues, a sprocket wheel associated with each traction wheel in driving connection therewith, and a power-driven endless chain extended tangentially over all sprocket wheels in driving engagement therewith to transmit concurrent motion thereto and to the traction wheels whereby to propel the work thereon.

11. A postforming machine according to claim 10 wherein means is provided in the second zone to deflect the chain in its movement over certain of the sprocket wheels therein to produce therewith an arcuate driving engagement of increased length and effectiveness.

12. A postforming machine of the kind described wherein a laminate strip, conditioned for pressure-bonding and applied flatwise to the contoured top face of an elongated core, is to be conformed and bonded thereto while the work is advanced lengthwise of itself through the machine, comprising means for propelling the work continuously along a fixed path of movement through the machine, means in a first zone for heating the laminate to a flexibilized state while the work is under propulsion, and a succession of means in a second zone moving synchronously with the work and positioned thereabove and at opposite sides thereof for applying simultaneous progressive and frictionless pressures to the laminate at spaced points lengthwise thereof for producing a conformation of the flexibilized laminate to the core and subsequent bonding thereto.

13. An elongated postforming machine of the kind described wherein a laminate strip, conditioned for pressure-bonding and applied flatwise to the profiled top face of an elongated core, is to be conformed and bonded thereto while the work is advanced lengthwise of itself and of the machine, comprising means for heating the laminate strip to a flexibilized state, a plurality of spaced-apart forming rolls mounted for rotation at points above the work in gravity-engagement with the flat laminate component thereof while still in a flexibilized state, thereby to produce a conformation of the laminate with the top face of the core, the forming rolls being positioned to pressure-engage laminate free edge portions lying beyond the confines of the side faces of the core whereby to extend the conformation of the laminate thereat to each proximate core side face as well.

14. A postforming machine according to claim 13 wherein the profiled top face of the core involves a continuous longitudinal depression and wherein the forming rolls are supplemented by a rotatable forming wheel having its periphery profiled complementary to the profile of the core top face, the wheel being positioned oppositely of the core profile depression and substantially in mesh therewith to depress the flexibilized laminate thereinto.

15. A postforming machine according to claim 13 wherein the forming rolls are arranged in sets of two, one spaced opposite the other and coaxial therewith, and means is provided for adjusting axial spacing between the rolls, as desired.

16. A postforming machine according to claim 13 wherein the forming rolls are mounted fast upon a succession of shafts, and mountings whereon the shafts are adjustably supported with capacity to shift the forming rolls toward and from the work.

17. A postforming machine according to claim 13 wherein the machine is provided with a pair of longitudinally extending spaced walls each formed with a plurality of like slots extending downwardly from its top edge, the slots in one wall being positioned oppositely of those in the other wall, a cross shaft supporting the forming rolls is extended over the work between each two opposite slots, mountings for the cross shafts are slidably fitted into the slots, and screw means is provided to engage each mounting for adjustably limiting the vertical movement thereof whereby to limit the forming rolls shifting movement toward the work.

18. In a postforming machine of the kind described wherein a laminate strip is conformed closely with and bonded to the contoured top face of an elongated core while moving through a fixed horizontal path, the provision, in combination, of a unitary power-driven router-like cutter rotatable about a vertical axis to one side of the moving work to describe a circle tangential to the adjacent side face of the core for trimming off, in flush relation therewith, any excess of laminate material projecting therebeyond, and a mounting whereon the unitary power-driven cutter is carried having means for shifting its position to adjust the cutter position closer to or further from the work, as desired.

19. A postforming machine according to claim 18 wherein multiple rolls idly mounted on vertical shafts are positioned upon opposite sides of the work to engage the proximate faces thereof at spaced lengthwise points close to the cutter whereby to laterally brace the work when operated upon thereby.

20. An elongated machine for operating upon work in which a laminate strip is applied flatwise to the top face of an elongated core having a side face beyond which a free edge portion of the laminate is laterally extended coplanarly, the said core faces and exposed back of the laminate strip being conditioned for mutual pressure-bonding, the machine comprising a supporting framework whereon is mounted an elongated base, propelling means whereon the work is supported adapted to advance the work lengthwise of itself and of the machine through a straight path adjacent the base, means for heating the laminate strip to the point of flexibility during initial advance of the work through the machine, means frictionlessly pressure-engaging the laminate strip, promptly after flexibilizing thereof, progressively for its entire length during a second stage of its advance through the machine to bend free edge portions of the laminate around the edge between the core top and side faces aforesaid to produce a close conforming engagement with the latter for the full length thereof, resilient means thereafter engaging the laminate edge portions so conformed to the core side face aforesaid continuously from end to end thereof during a third stage of advance of the work to apply thereto a prolonged and sufficient pressure to produce a bonding thereof to the core face engaged thereby, all of the said means thus operating upon the work being aligned upon the base in spaced relation to each other, means for adjusting all of said means to positions toward and from the work, as required, to compensate for variations in the width thereof, and hold-down means movable with the work engaging the laminate throughout its area overlying the top face of the core for completing the bond therebetween and maintaining the work continuously upon its supporting propelling means through the second and third stages of its advance through the machine.

21. In a postforming machine of the kind described wherein a laminate strip, conditioned for pressure bonding and initially applied flatwise to the profiled top face of an elongated core, is to be conformed and bonded thereto while the work is advanced lengthwise of itself along a fixed path through successive heating, bonding and bending zones, comprising a plurality of guiding and pressure rolls for holding the work in its fixed movement path, arranged in two rows extending through the heating, bending and bonding zones along opposite side of said path, a vertical spindle whereon each roll is idly mounted for rotation, means for adjusting the position of each roll toward and from the work, the rolls in the heating zone being positioned wholly below the unbent laminate strip for engagement with the uncovered side faces of the core, and the rolls in the bonding zone being positioned for pressure-engagement with downturned laminate portions overlying a side face of the core thereby to maintain the laminate firmly in such conformed position concurrently with its bonding thereto.

22. An elongated postforming machine of the kind described wherein a laminate strip, conditioned for pressure-bonding and applied in a flat state to the top face of an elongated core, is to be conformed and bonded thereto while the work is advanced lengthwise of itself and of the machine, comprising means for heating the strip to a flexibilized state, and a plurality of free-running idling rolls of smooth resilient material arranged lengthwise of the machine at spaced intervals in positions to frictionlessly and tracelessly pressure-engage the flexibilized strip to conform and thereafter bond the laminate to the top face of the core while guiding the work concurrently through a fixed path lengthwise of the machine.

References Cited by the Examiner

UNITED STATES PATENTS 3,094,716    6/1963    Friedman _________ 156—212

EARL M. BERGERT, *Primary Examiner.*

W. J. VAN BALEN, *Assistant Examiner.*

UNITED STATES PATENT OFFICE

CERTIFICATE OF CORRECTION

Patent No. 3,296,056                                                     January 3, 1967

Anthony M. Bechtold

It is certified that error appears in the above identified patent and that said Letters Patent are hereby corrected as shown below:

Column 12, line 22, "core" should read -- strip --.

Signed and sealed this 2nd day of December 1969.

(SEAL)
Attest:

Edward M. Fletcher, Jr.                              WILLIAM E. SCHUYLER, JR.
Attesting Officer                                              Commissioner of Patents